United States Patent
Yamamoto et al.

(10) Patent No.: US 9,950,479 B2
(45) Date of Patent: Apr. 24, 2018

(54) METHOD FOR PRODUCING FRP

(71) Applicant: Toray Industries, Inc., Tokyo (JP)

(72) Inventors: Kohnosuke Yamamoto, Nagoya (JP); Seiji Tsuji, Nagoya (JP); Kazuya Watanabe, Nagoya (JP)

(73) Assignee: Toray Industries, Inc. (JP)

( * ) Notice: Subject to any disclaimer, the term of this patent is extended or adjusted under 35 U.S.C. 154(b) by 127 days.

(21) Appl. No.: 15/230,978

(22) Filed: Aug. 8, 2016

(65) Prior Publication Data

US 2016/0339648 A1 Nov. 24, 2016

Related U.S. Application Data

(62) Division of application No. 14/001,358, filed on Aug. 23, 2013, now Pat. No. 9,604,415.

(30) Foreign Application Priority Data

Feb. 25, 2011 (JP) ................................ 2011-039842
Feb. 25, 2011 (JP) ................................ 2011-040626

(51) Int. Cl.
*B29C 70/48* (2006.01)
*B29C 45/00* (2006.01)
(Continued)

(52) U.S. Cl.
CPC .......... *B29C 70/48* (2013.01); *B29C 45/0005* (2013.01); *B29C 45/0046* (2013.01);
(Continued)

(58) Field of Classification Search
None
See application file for complete search history.

(56) References Cited

U.S. PATENT DOCUMENTS 4,942,013 A 7/1990 Palmer et al.
6,964,561 B2 * 11/2005 Louderback .......... B29C 70/443
264/257

(Continued)

FOREIGN PATENT DOCUMENTS

| JP | 1-242219 A | 9/1989 |
| JP | 2010-89501 A | 4/2010 |
| WO | 2008/114809 A1 | 9/2008 |

Primary Examiner — Edmund H Lee
(74) Attorney, Agent, or Firm — DLA Piper LLP (US)

(57) ABSTRACT

A method of producing FRP includes disposing a preform made of a reinforcing fiber base material in a cavity of a mold, providing a resin injection path and a suction path that sucks at least air to the mold, and causing resin from the resin injection path to flow in a direction toward the suction path in the cavity to be impregnated into the preform, wherein 1) a high flow resistance region for partially making the resin flowing in the preform hardly flow is formed in the preform itself, 2) a flow front of the resin flowing in the direction toward the suction path through the high flow resistance region is controlled to settle within a permitted region that has been predetermined relative to a shape of a product to be molded, 3) the resin injection path is formed from a runner provided around the preform and the suction path is disposed at a central portion of the preform, and the high flow resistance region is formed at a corresponding part corresponding to a part around the suction path as a high flow resistance region to cause the resin flowing in the preform from a part around the corresponding part toward the corresponding part hardly flow at the corresponding part.

8 Claims, 7 Drawing Sheets

(51) Int. Cl.
*B29C 70/54* (2006.01)
*B29K 105/06* (2006.01)
*B29L 9/00* (2006.01)

(52) U.S. Cl.
CPC ........ *B29C 70/548* (2013.01); *B29K 2105/06* (2013.01); *B29L 2009/00* (2013.01)

(56) References Cited

U.S. PATENT DOCUMENTS

| | | | |
|---|---|---|---|
| 7,943,078 B2 * | 5/2011 | Sekido | B29C 33/0066 264/257 |
| 8,808,612 B2 | 8/2014 | Alms et al. | |
| 8,945,450 B2 | 2/2015 | Shindo et al. | |
| 9,156,208 B2 | 10/2015 | Heim et al. | |
| 2002/0155186 A1 * | 10/2002 | Walsh | B29C 70/443 425/110 |
| 2003/0227107 A1 | 12/2003 | Stewart | |
| 2004/0140587 A1 | 7/2004 | Hadley | |
| 2007/0182071 A1 * | 8/2007 | Sekido | B29C 33/0066 264/511 |
| 2010/0108245 A1 | 5/2010 | Nishiyama et al. | |
| 2011/0192531 A1 * | 8/2011 | Sekido | B29C 33/0066 156/245 |

* cited by examiner

METHOD FOR PRODUCING FRP

This application is a divisional of U.S. patent application Ser. No. 14/001,358, filed Aug. 23, 2013, now U.S. Pat. No. 9,604,415, which is the national stage filing of PCT/JP2012/054033, filed Feb. 21, 2012.

TECHNICAL FIELD

This disclosure relates to a method of producing FRP (Fiber Reinforced Plastic), and specifically, to improvement of a method of producing FRP by impregnating an injected resin into a preform made of a reinforcing fiber base material by RTM (Resin Transfer Molding) method.

BACKGROUND

An RTM method which is a so-called "RTM multi-point injection method" is known wherein a preform made of a reinforcing fiber base material is disposed in a cavity of a mold, and a resin is injected from a plurality of resin injection ports facing one surface of the preform to impregnate the resin into the reinforcing fiber base material of the preform (for example, JP-A-2010-89501). Further, an RTM method which is a so-called "line injection method" is also known wherein a resin injection line extending along an end surface of a preform is provided at an end surface side of the preform, and a resin is supplied and injected from the end surface of the preform disposed in a cavity.

In the above-described multi-point injection method, as compared to the line injection method, because the resin can be spread in all directions from each of many injection points disposed on one surface of the preform, it has an advantage excellent in high-speed impregnation property. Further, since injection points are disposed on one surface of the preform, without being greatly influenced by a peculiar flow such as a race-tracking (a phenomenon wherein resins having flowed from different directions regulate their flows to each other and a stripe-like residence portion is formed), that is liable to occur at a position around a preform, the injected resin from each of the respective injection points can be spread in a flow front shape (a shape of a tip portion of a resin flow) in accordance with the resistance of the preform or in a flow front shape corresponding to the shape of an injection port (for example, in the case of a circular injection port, a constant-thickness preform or a quasi-isotropic laminated preform, a circular flow front shape is likely formed). However, because it is a method of injecting a resin into a closed mold, an air trap is liable to occur within a region of a product to be molded, but, for such a case, a method of assisting the resin injection and impregnation by vacuum suction is also introduced.

On the other hand, in the line injection method, because resin is injected from a predetermined resin injection line in a specified direction, the resin injection speed can be controlled relatively easily, and the position of a flow front and the degree of the progress thereof can be monitored also easily. However, if the line of the shape of the flow front does not progress in a desired shape or if there occurs a place hardly reached with the flow front, a portion lacking in impregnated resin (resin starving portion or resin non-impregnated portion) is liable to be generated, and further, there is a fear that a portion which is not sufficiently favorable in surface quality is generated.

However, even in any of the above-described multi-point injection method and line injection method, a race-tracking is still liable to occur around a preform, and there remains a fear that resin first flows around the outer circumferential portion of a preform and air is trapped in a product. If air is trapped in a product, a resin starving portion or a resin non-impregnated portion is liable to be generated and, further, there is a fear that a portion which is not sufficiently favorable in surface quality is generated.

For example, in the above-described RTM multi-point injection method, there is a case where the following problem may occur. The flow front shape depending upon the resistance of a preform or the shape of a resin injection port does not always coincide with the shape of a molded product to be molded. Therefore, there is a case where an air trap is caused within the product by race-tracking and the like. Further, in the method of assisting by vacuum suction, frequently a sufficient time cannot be taken to completely create a vacuum condition, from the balance with a molding cycle time. Therefore, in particular, in the case of a large mold (cavity), there is a case where the molding finishes at a condition where air is finally trapped. Furthermore, as a method of reducing air traps, although there is a method of sucking and evacuating air and resin together (because it is difficult to separate them, as the resin contains bubbles), cleaning an evacuation port is troublesome and, therefore, it involves another problem.

Accordingly, paying attention to the above-described limits in conventional technologies, there is a need to provide a method of producing FRP using RTM method, capable of obtaining a molded product favorable in quality with no air traps, in particular, capable of obtaining a molded product with no air traps by using a completely closed mold.

SUMMARY

We provide a method of producing FRP in which a preform made of a reinforcing fiber base material is disposed in a cavity of a mold, a resin injection path and a suction path that sucks at least air are provided to the mold, and resin from the resin injection path is caused to flow in a direction toward the suction path in the cavity to be impregnated into the preform, wherein a high flow resistance region for partially making the resin flowing in the preform hardly flow is formed in the preform itself, and a flow front of the resin flowing in the direction toward the suction path through the high flow resistance region is controlled to settle within a permitted region that has been predetermined relative to a shape of a product to be molded.

We also provide a method of producing FRP including disposing a preform made of a reinforcing fiber base material in a cavity of a mold, providing a resin injection path and a suction path that sucks at least air to the mold, and causing resin from the resin injection path to flow in a direction toward the suction path in the cavity to be impregnated into the preform, wherein 1) a high flow resistance region for partially making the resin flowing in the preform hardly flow is formed in the preform itself, 2) a flow front of the resin flowing in the direction toward the suction path through the high flow resistance region is controlled to settle within a permitted region that has been predetermined relative to a shape of a product to be molded, 3) the resin injection path is formed from a runner provided around the preform and the suction path is disposed at a central portion of the preform, and the high flow resistance region is formed at a corresponding part corresponding to a part around the suction path as a high flow resistance region to cause the resin flowing in the preform from a part around the corresponding part toward the corresponding part hardly flow at the corresponding part.

EXPLANATION OF SYMBOLS

Figure 1:
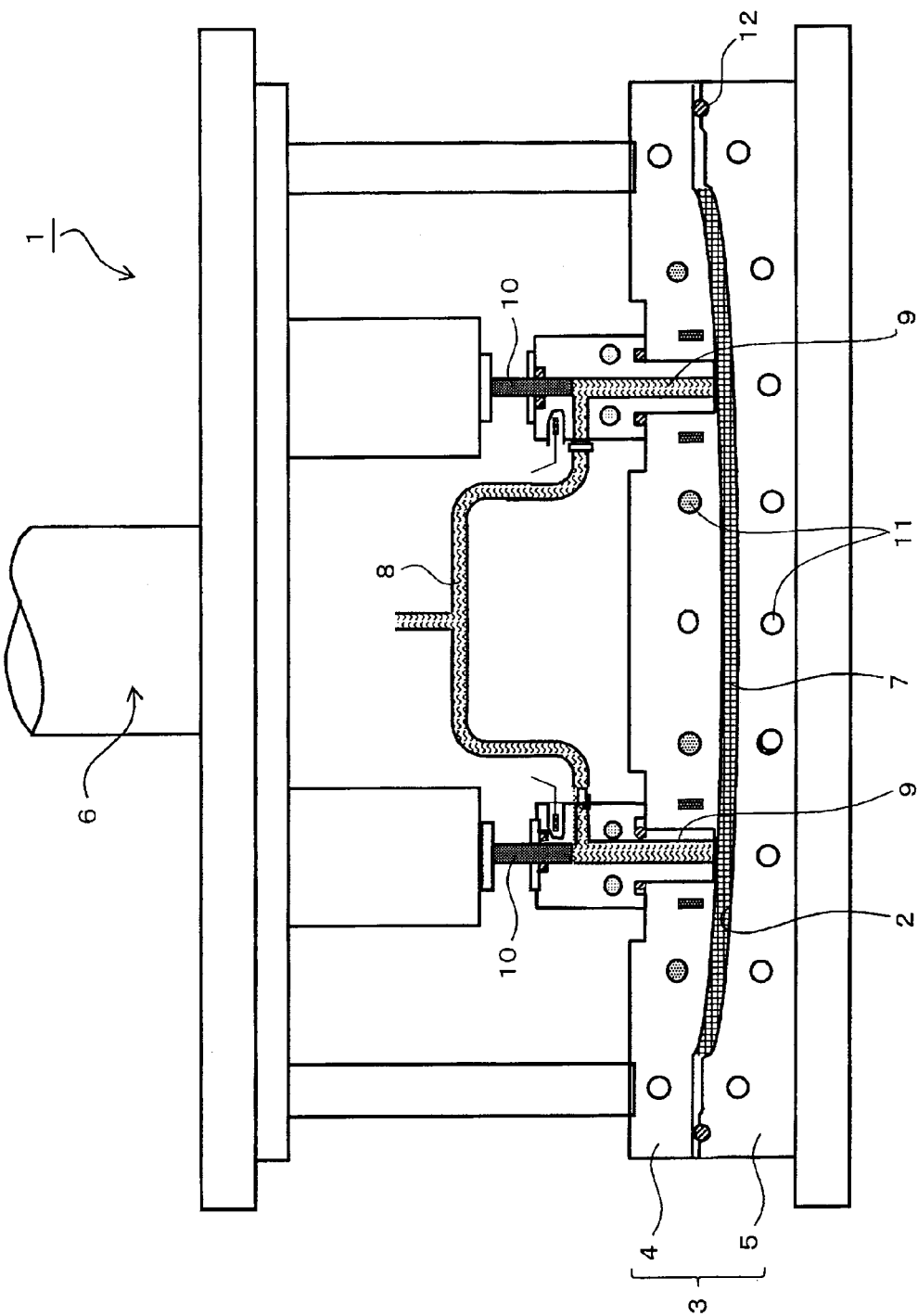
FIG. 1 is a schematic vertical sectional view of an RTM apparatus used for carrying out our method according to a first example, and a sectional view as viewed along B-B line of FIG. 2.

1: RTM apparatus
2: cavity
3: mold
4: upper mold
5: lower mold
6: press mechanism
7: preform
8: resin supplying path
9: resin injection port
10: valve body
11: heat medium circulation path
12: seal material
21: outline of product
22: high flow resistance region
23: air trap region
24: distance
25: suction port
26: flow path reduced part
27: resin detecting sensor
28: valve body
31: flow front
32: trapped air compression part
101: RTM apparatus
102: cavity
103: mold
104: upper mold
105: lower mold
106: press mechanism
107: preform
108: runner
109: suction port
110: resin injection port
111: valve body
112: seal material
113: heat medium circulation path
121: high flow resistance region
122: outer circumference part of preform
123: outline of product
124: resin detecting sensor
131: flow front
132: non-impregnated region
133: void region
134: region outside product

DETAILED DESCRIPTION

We thus provide a method of producing FRP in which a preform made of a reinforcing fiber base material is disposed in a cavity of a mold, a resin injection path and a suction path for sucking at least air are provided to the mold, and resin from the resin injection path is caused to flow in a direction toward the suction path in the cavity to be impregnated into the preform, and is characterized in that a high flow resistance region to partially cause the resin flowing in the preform hardly flow is formed in the preform itself, and a flow front of the resin flowing in the direction toward the suction path through the high flow resistance region is controlled to settle within a permitted region that has been predetermined relatively to a shape of a product to be molded.

In such a method of producing FRP to add an improvement to the aforementioned RTM multi-point injection method, for example, a structure can be employed wherein the above-described resin injection path is formed from a plurality of resin injection ports opened facing one surface of the preform disposed in the cavity, the high flow resistance region is formed as a high flow resistance region to partially make the resin flowing in the preform from an inside part of the preform toward an outer circumference part of the preform hardly flow to extend along the outer circumference part of the preform at a position outside a molded product relatively to an outline of the product to be molded (a method for producing FRP according to a first example). By such a structure, it becomes possible to control the flow front of the resin to settle within the permitted region predetermined relatively to the shape of the product to be molded.

Further, to add an improvement to the aforementioned line injection method, for example, a structure can be employed wherein the above-described resin injection path is formed from a runner provided around the preform and the above-described suction path is disposed at a central portion of the preform, and the high flow resistance region is formed at a corresponding part corresponding to a part around the suction path as a high flow resistance region to cause the resin flowing in the preform from a part around the corresponding part toward the corresponding part hardly flow at the corresponding part (a method for producing FRP according to a second example). Also by such a structure, it becomes possible to control the flow front of the resin to settle within the permitted region predetermined relatively to the shape of the product to be molded. In this case of the second structure, the above-described high flow resistance region is formed basically at a position outside a molded product relative to an outline of the product to be molded or at a position where an appearance design property is not required in the product to be molded.

In the above-described matter, a preferable range of a degree of hardness in resin flow in the high flow resistance region can be expressed, for example, by permeability. With respect to the permeability that is an impregnation property of a resin into a reinforcing fiber base material, it is known that it can be generally expressed by the following equation:

$$l=(\in/(1-\in))\sqrt{(\alpha P/2)} \times \int [dt/\sqrt{(\mu(t)t)}]$$

l: permeability, $\in$: resistance of base material, $\alpha$: constant, P: vacuum pressure in base material, $\mu(t)$: viscosity, t: passed time.

The permeability corresponds to a distance (thickness) in which the resin is impregnated into the reinforcing fiber base material. When the above-described hardness in resin flow in the high flow resistance region is expressed by the permeability, the permeability in the high flow resistance region is preferably 0.8 time or less relative to the permeability in a part within the range of a product to be molded, more preferably 0.5 time or less.

In the method of producing FRP according to the above-described first example, the high flow resistance region of partially causing the resin hardly flow by increasing the flow resistance of the resin is formed in the preform itself, and the high flow resistance region is formed to extend along the outer circumference part of the preform at a position outside the product relatively to the outline of the product to be molded. Each flow front of the resin injected from each injection point of the plurality of the resin injection ports is likely to spread in a shape of a circle or the like at an initial stage and, then, is likely to spread toward the outer circumference part of the preform at a state of an indefinite shape formed by joining of respective spread flow fronts or at a state of the circular shape or the like partially maintained.

Shortly, when a part of the flow front reaches the above-described high flow resistance region, because the resin flow resistance rapidly becomes great at the reached portion, at that portion spreading of the flow front is once suppressed. Succeedingly, the flow front in an adjacent region which has not yet reached the high flow resistance region is likely to spread toward the outer circumference part of the preform, successively reaches the high flow resistance region and, similarly to in the above-described manner, because the resin flow resistance rapidly becomes great at the portion reached to the high flow resistance region, at that portion spreading of the flow front is once suppressed. As a result of such behaviors of resin flow performed successively, the resin spread from the inside part of the preform toward the outer circumference part of the preform is filled (spread) at least over the whole of the range of the region of the product to be molded among the range surrounded by the high flow resistance region, and air (bubbles) involved at the process of the resin spreading is successively pushed out to the side of the high flow resistance region positioned outside the range of the product.

As a result, the injected resin is favorably impregnated into the reinforcing fiber base material of the preform over the entire region of the product to be molded without causing air to be involved and, while the advantage of excellent high-speed impregnation property due to RTM multi-point injection method is served as it is, it becomes possible to obtain a desirable molded product with no air traps. Although the above-described high flow resistance region is provided to the preform itself, because this high flow resistance region is formed at a position outside the product to be molded, it may be removed after a predetermined molding. Although by this removal the yield of the material may be slightly reduced, the advantages, much greater than that, of an excellent quality with no air traps and a shortened cycle time for molding ascribed to an excellent high-speed impregnation property of the multi-point injection method can be obtained.

However, since the high flow resistance region is formed at a position outside the product to be molded, it is preferred to suppress the area therefor to a minimum from the viewpoint of the yield of the material and the like. On the other hand, as long as the high flow resistance region can be provided around the product, it is considered to be a molding method in which it is not necessary to arrange the end part of the base material by cutting. Therefore, it is preferred from the point that a process of arranging the end part by cutting is unnecessary and a product can be molded at a stable condition.

In the method of producing FRP according to the above-described first example, it is preferred that an air trap region to suck air discharged through at least the high flow resistance region is formed by the mold at a position outside the high flow resistance region of the preform to extend along the high flow resistance region. If the air trap region is thus formed at an outer circumference side of the high flow resistance region, although spreading the flow front of the resin is once suppressed at the high flow resistance region as aforementioned, since the air pushed out together with the resin is more flowable compared to the resin, the air is sent to or sucked by the air trap region through the high flow resistance region. Therefore, air is further hardly left within the range of the product to be molded, and the quality of the molded product can be further improved.

The volume of the above-described air trap region is preferably 0.1 time or more and 50 times or less relative to a space volume within the product. Further preferably, it is desired that the above-described volume is 0.1 time or more and 2 times or less relative to a space volume after compression when the space volume is compressed by the resin injection pressure. In the case where the space is sacked by vacuum, the above-described volume may be reduced by the ratio corresponding to the vacuum suction. Although at least air may be trapped at this air trap region (namely, at a position irrelevant to the molded product), more preferably, trapped air is sucked and removed from a suction port opened at an appropriate position of the air trap region.

Further, it is preferred that a flow path reduced part to cause resin to hardly flow when resin is discharged through the high flow resistance region is formed by the mold at a position provided with a suction port opened to the air trap region or its vicinity. Namely, even if there is a case where resin flows up to a position near the suction port of the air trap region, it is suppressed that the resin is sucked into the suction port, by the flow path reduced part without greatly reducing the air suction performance. The suction port is preferably disposed within 50 cm$^2$ from a position farthest from the resin injection port. Furthermore, in a portion near the suction port, to form the above-described flow path reduced part, the thickness of the cavity is preferably small. This cavity thickness is determined, for example, to satisfy the following equation:

$$2.5 \times 10^{-6} \text{ mm} < t^2/L$$

t<t' t (mm): cavity thickness at a position near suction port
t' (mm): cavity thickness at a position other than a position near suction port
L (mm): minimum distance from a position near suction port to a position other than a position near suction port.

By such a setting, it is possible to reduce air in the mold efficiently and as much as possible.

Further, it is preferred that a resin detecting sensor is disposed at a position near the above-described suction port. When resin is discharged through the high flow resistance region, the resin is detected at a position near the position provided with the suction port. In such a structure, it becomes possible to stop the impregnation without discharging the resin from the suction port.

Further, the above-described high flow resistance region can be formed by reducing the thickness of the outer circumference part of the preform by the mold at the position outside the molded product relatively to the outline of the product to be molded, and can also be formed by enhancing the density of arrangement of reinforcing fibers in the outer circumference part of the preform in advance at the position outside the molded product relatively to the outline of the product to be molded.

Further, a method can be employed wherein the plurality of resin injection ports are configured to be controlled by opening/closing independently from each other, and the timing to open respective resin injection ports is controlled so that flow fronts of resin injected from the respective resin injection ports reach the high flow resistance region substantially simultaneously. Namely, in the case where there are many resin injection points, the timing of opening the injection ports is controlled so that the resins injected from substantially all the injection points reach the above-described high flow resistance region, being hardly flowed, simultaneously. By such a control, it becomes possible to perform desired resin injection and impregnation at a minimum resin injection amount.

In the above-described method of producing FRP according to the second example, a runner to inject resin is provided around the preform and from the runner the resin is injected from the portion around the preform toward the central portion of the preform. The suction path is disposed at a central portion of the preform and the high flow resistance region of partially causing the resin to hardly flow by making the flow resistance of resin greater is formed in the preform itself around the suction path. The resin injected from the runner flows toward the suction path disposed in the central part of the preform and the flow front of the injected resin also flows toward the suction path. Shortly, when a part of the flow front reaches the above-described high flow resistance region formed around the suction path, because the flow resistance of the resin rapidly becomes great at the reached portion, at that portion spreading of the flow front is once suppressed. Succeedingly, the flow front in an adjacent region which has not yet reached the high flow resistance region is likely to spread toward the high flow resistance region formed around the suction path, successively reaches the high flow resistance region, and similarly to in the above-described manner, because the resin flow resistance rapidly becomes great at the portion reached to the high flow resistance region, at that portion spreading of the flow front is once suppressed.

As the result of such behaviors of resin flow performed successively, in the resin spread from the outer circumference part of the preform toward the inside part of the preform, the whole of the flow front reaches at least the high flow resistance region, and for the region of the preform other than the region surrounded by the high flow resistance region, the injected resin is filled (spread) sufficiently over the whole of the region, and air (bubbles) involved at the process of the resin spreading is successively collected within the range surrounded by the high flow resistance region, namely, collected to the part provided with the suction path. As a result, the injected resin is favorably impregnated into the reinforcing fiber base material of the preform over the entire region of the target preform region without causing air to be involved, and it becomes possible to obtain a desirable molded product with no air traps. Although the above-described high flow resistance region is provided to the preform itself, because, as aforementioned, this high flow resistance region is formed basically at a position outside the product to be molded, or at a position which does not require an appearance design property in the product to be molded, it does not become a problem, and it may be left as it is or it may be removed as needed after molding. However, it is preferred to suppress the area of the high flow resistance region to a minimum area from the viewpoint of the yield of the material and the like. In the case of the high flow resistance region provided outside the product, the quality of the molded product can also be improved by introducing a medium (same resin, resin cured more early than the injected resin, or compressible resin) from the suction path.

In the above-described method of producing FRP according to the second example, it is preferred that the resin having flowed into the high flow resistance region is detected at a position near the portion provided with the suction path. In such a structure, it becomes possible to stop the impregnation without discharging the resin from the suction port. As the resin detecting sensor, for example, a dielectric-type sensor, a sensor using an optical fiber, a pressure sensor and the like can be used.

Further, the above-described high flow resistance region can be formed by reducing the thickness of the preform at the high flow resistance region by the mold, and can also be formed by enhancing the density of arrangement of reinforcing fibers in the preform at the position of the high flow resistance region in advance.

Further, in the above-described methods of producing FRP according to the first and second examples, a method can also be employed wherein the preform is formed from a laminate of a plurality of reinforcing fiber base materials, and the resin flow resistance of a reinforcing fiber base material of an inner layer is set to be lower than that of a reinforcing fiber base material of a surface layer. Namely, a layer exhibiting a good flow is put in as an intermediate layer of the preform. In this layer exhibiting a good flow, it is preferred that the average value of the permeability thereof is better than that of the above-described high flow resistance region exhibiting a bad flow by 10 times or more. More preferably, it is better by 50 times or more. Further, it is preferred that the permeability of the intermediate layer of the preform is better than that of the surface layer by 1.5 times or more. More preferably, it is better by 2 times or more. By such a structure, it becomes possible to store air in the interior as much as possible without discharging it to the outer surface side as much as possible. The air in the interior is pushed out to the side of the portion provided with the suction path through the above-described intermediate layer exhibiting a good flow.

Furthermore, it is also preferred that the thickness of the preform in the area within the product to be molded before being disposed is set to be greater than the height of a corresponding part of the cavity. For example, the thickness of the preform is set to be greater than the height of the cavity by 0.5% or more and 20% or less at a rate converted into volume content of reinforcing fibers. In such a manner, since the preform is pressed by an appropriate pressing force from both surface sides by closing of the mold and the preform becomes a state compressed slightly, the inner surface of the mold and the surface of the preform are tightly contacted to each other at a good condition, and even in the case where a small amount of air is contained in the injected resin from the resin injection path, it becomes possible to suppress the contained air or the resin containing air to run on the surface of the preform, and it can contribute to improvement of the surface quality of the molded product.

Thus, in our method of producing FRP, it becomes possible to obtain a molded product having a high quality which does not cause an undesired air trap. In the method of producing FRP according to a first example, while an advantage excellent in high-speed impregnation property due to RTM multi-point injection method is served substantially as it is and a high productivity is maintained, by forming the high flow resistance region at a position of the preform itself outside the product relative to the outline of the product to be molded, it becomes possible to obtain a high-quality molded product with no undesired air traps within the range of the product. In particular, by forming the air trap region at a position outside the high flow resistance region and adequately sucking and removing the air discharged, a further high-quality molded product can be obtained efficiently.

Further, in the method of producing FRP according to a second example, the resin injected from the runner can be intentionally controlled to a desirable flow to make the flow front thereof reach the high flow resistance region over the entire flow front, and it becomes possible to obtain a high-quality molded product with causing no undesired air traps within the region of the preform to be made as a product.

Hereinafter, examples will be explained referring to the figures.

FIG. 1 shows an example of an RTM apparatus used for carrying out a method according to a first example. In FIG. 1, RTM apparatus 1 has an upper mold 4 and a lower mold 5 as a mold 3 to form a cavity 2, and the upper mold 4 is closed and opened by a press mechanism 6. In cavity 2, a preform 7 composed of a laminate of reinforcing fiber base materials and, for example, formed in a predetermined shape in advance is disposed. At a condition where this preform 7 is disposed in cavity 2, upper mold 4 is closed relatively to lower mold 5, a resin to form an FRP is supplied from a resin supplying path 8, and the resin is injected into the cavity 2 from resin injection ports 9 as a plurality of resin injection paths opened facing one surface (upper surface) of the preform 7, and impregnated into the reinforcing fiber base materials forming the preform 7. Resin injection port 9 is opened/closed by, for example, a pin-like valve body 10, and the circumference of cavity 2 is sealed by a seal material 12. Mold 3 is heated and cooled by, for example, a heat medium circulated in a heat medium circulation path 11, at the time of resin injection, it is heated and a favorable resin impregnation is attempted and, after the resin impregnation, it is cooled (possible by natural heat radiation) and the resin having been injected and impregnated is cured to make a predetermined FRP molded product.

Figure 2:
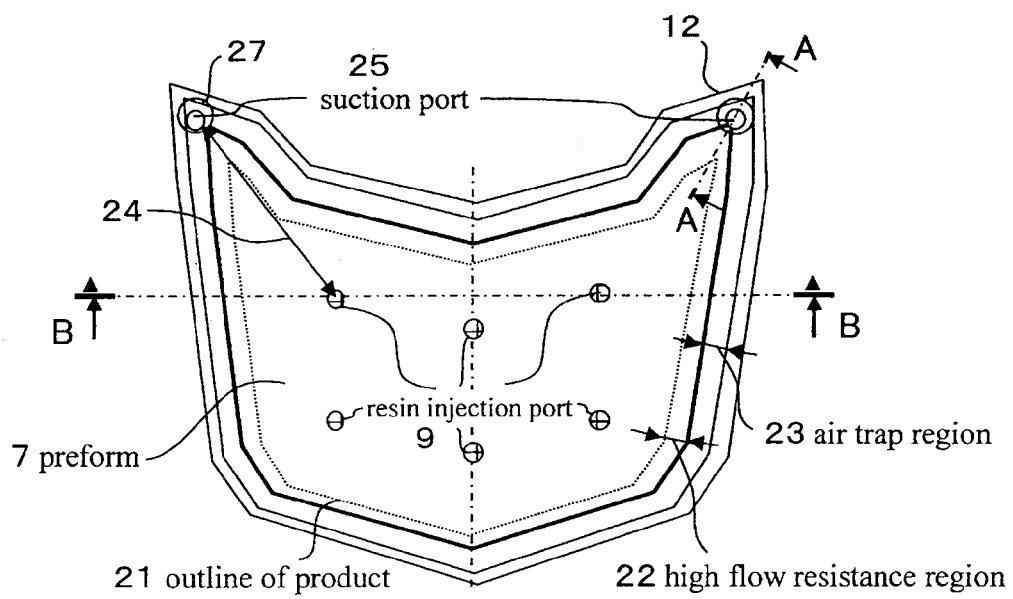
FIG. 2 is a schematic perspective plan view of an interior of a mold of the apparatus depicted in FIG. 1 as viewed from the upper surface side of the mold.
Figure 3:
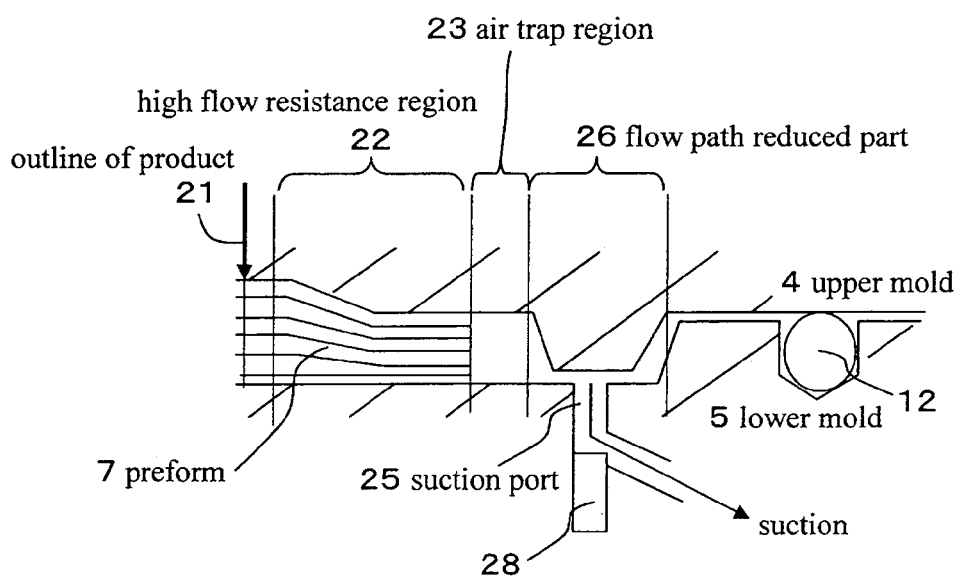
FIG. 3 is an enlarged partial sectional view as viewed along A-A line of FIG. 2.

The plurality of resin injection ports 9 are disposed as a plane view such as shown in FIG. 2 relative to one surface of preform 7. As a plane view, preform 7 is formed greater than an outline 21 of a product to be molded and, in this preform 7 itself, a high flow resistance region 22 to partially make the resin spreading from the inside part of the preform 7 (a region inside the outline 21 of the product) toward the outer circumference part of the preform 7 hardly flow is formed to extend along the outer circumference part of the preform 7 at a position outside the product relatively to the outline 21 of the product to be molded. In this example, as shown in FIG. 3, this high flow resistance region 22 is formed by reducing the thickness of the outer circumference part of preform 7 by mold 3 (upper mold 4 and lower mold 5) at a position outside the molded product relatively to outline 22 of the product. However, as aforementioned, the high flow resistance region can also be formed by enhancing the density of arrangement of reinforcing fibers in the outer circumference part of the preform in advance at a position outside the molded product relatively to the outline of the product.

As shown in FIGS. 2 and 3, an air trap region 23 to suck air discharged through at least high flow resistance region 22 is formed by mold 3 at a position outside the high flow resistance region 22 to extend along the high flow resistance region 22. Relative to this air trap region 23, at a position farthest from any of a plurality of resin injection ports 9, for example, at a position away from that by a distance 24, a suction port 25 as a suction path is provided, and a flow path reduced part 26 to make resin hardly flow when resin is discharged through high flow resistance region 22 is formed by mold 3 at a position provided with the suction port 25 or its vicinity (FIG. 3). It is preferred that near this position provided with suction port 25, a resin detecting sensor 27 to detect the resin when the resin is discharged through high flow resistance region 22 is provided near this position provided with suction port 25. It is possible to control the suction from suction port 25, for example, as shown in FIG. 3, by the opening/closing operation of a pin-like valve body 28.

Further, although it is not shown in the figures, a structure can also be employed wherein the plurality of resin injection ports 9 are configured to be controlled with opening/closing independently from each other, and a controller that controls the opening timing of each resin injection port 9 is provided so that the tips of the flows (flow fronts) of the resins injected from respective resin injection ports 9 reach high flow resistance region 22 substantially simultaneously.

Figure 4A:
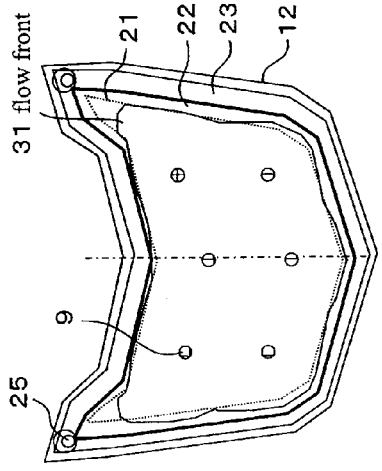
FIGS. 4(A) to 4(E) are schematic plan views showing steps of spreading of an injected resin in the mold depicted in FIG. 2.
Figure 4B:
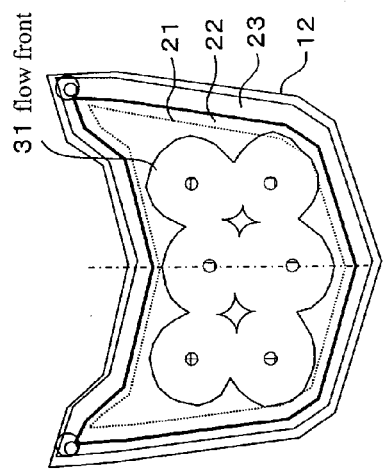
Figure 4C:
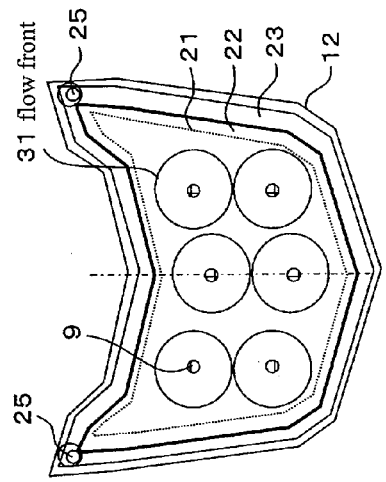
Figure 4D:
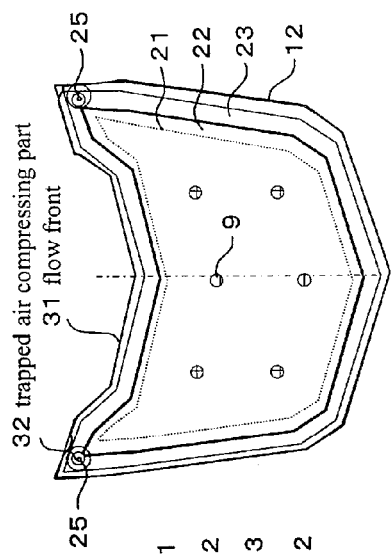
Figure 4E:
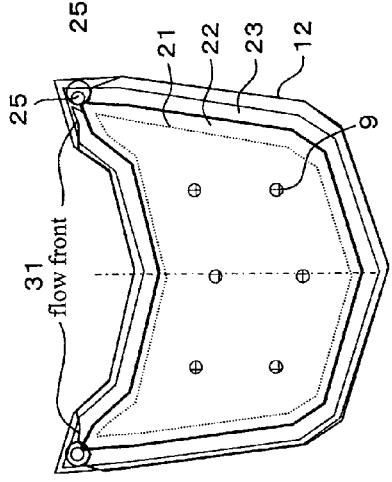

In our method of producing FRP carried out by using thus constructed RTM apparatus 1, the flows of the resins injected from the respective resin injection ports 9 progress, for example, as shown in FIG. 4(A) to (E). As shown in FIG. 4(A), when the resin injection from the respective resin injection ports 9 is started, flow front 31 of each injected resin spreads at a circular shape. Shortly, parts of the respective flow fronts 31 are joined to each other, the condition reaches the state shown in FIG. 4(C) through the state shown in FIG. 4(B). When the part of the flow front 31 of the resin flow which is likely to spread toward the outer circumference part of preform 7 reaches high flow resistance region 22, at the reached portion the flow resistance of the resin rapidly becomes great, the spreading of the flow front 31 is once suppressed. This suppressing state successively progresses in the direction in that the high flow resistance region 22 extends, shortly as shown in FIG. 4(D), the resin flow progresses over the entire region at least within the outline 21 of the product, further up to the part over most of the high flow resistance region 22, and furthermore over the part except the portion near suction port 25 of air trap region 23. When the spreading of flow front 31 progresses up to the portion near suction port 25, suction of the suction port 25 may be stopped. Even if it is stopped, because a negative pressure due to the suction up to that time remains, as shown in FIG. 4(E), a trapped air compression part 32 is generated, and the resin is delivered sufficiently up to a part immediately near the suction port 25.

In the above-described steps of the spreading of flow front 31 in the resin flow, the resin being spread from the inside part of preform 7 toward the outer circumference part of the preform 7 is filled sufficiently well at least over the whole of the range of the region of the product to be molded and impregnated into the reinforcing fiber base material of the preform 7, and accompanying to the resin spreading, air involved in the preform 7, further, even air (bubbles) mixed in the resin, is pushed out successively toward the side of high flow resistance region 22 positioned outside the range of the product and, further, to air trap region 23. Therefore, the injected resin is impregnated well into the reinforcing fiber base material of the preform without causing air to be involved, selectively over the entire region of the product to be molded and, while the advantage of excellent high-speed impregnation property due to RTM multi-point injection method is served as it is and shortening of the molding cycle time can be achieved, it becomes possible to obtain a desirable molded product with no air traps. After predetermined molding, high flow resistance region 22 having been provided outside the outline 21 of the product may be removed as needed together with the resin impregnated thereinto.

Figure 5:
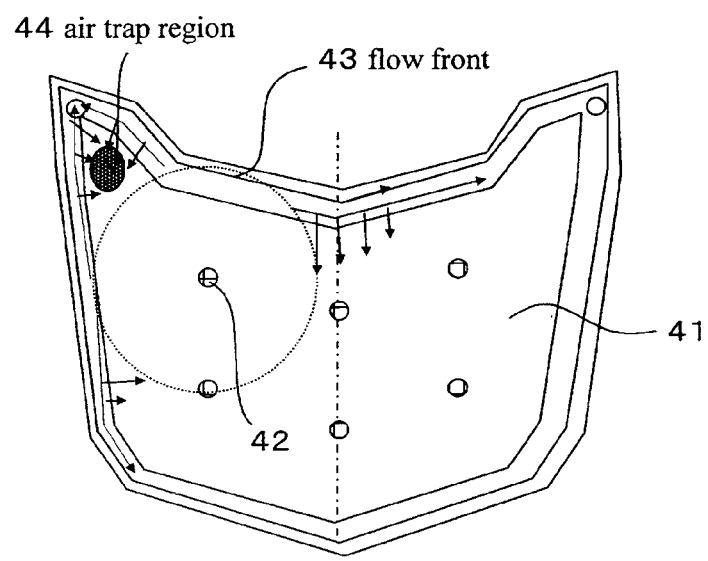
FIG. 5 is a schematic plan view showing an example of spreading state of an injected resin in a conventional mold for comparison.

In FIG. 5, for comparison, shown is an example of spreading of a flow front 43 of the resin injected from a resin injection port 42 provided relatively to a preform 41 in a conventional RTM process. Even within the region of the product, an air trap region 43 may be generated in a portion which the resin is hardly delivered, or undesired air flow as shown by the arrows may occur, and air is likely to be trapped in the molded product.

Figure 6:
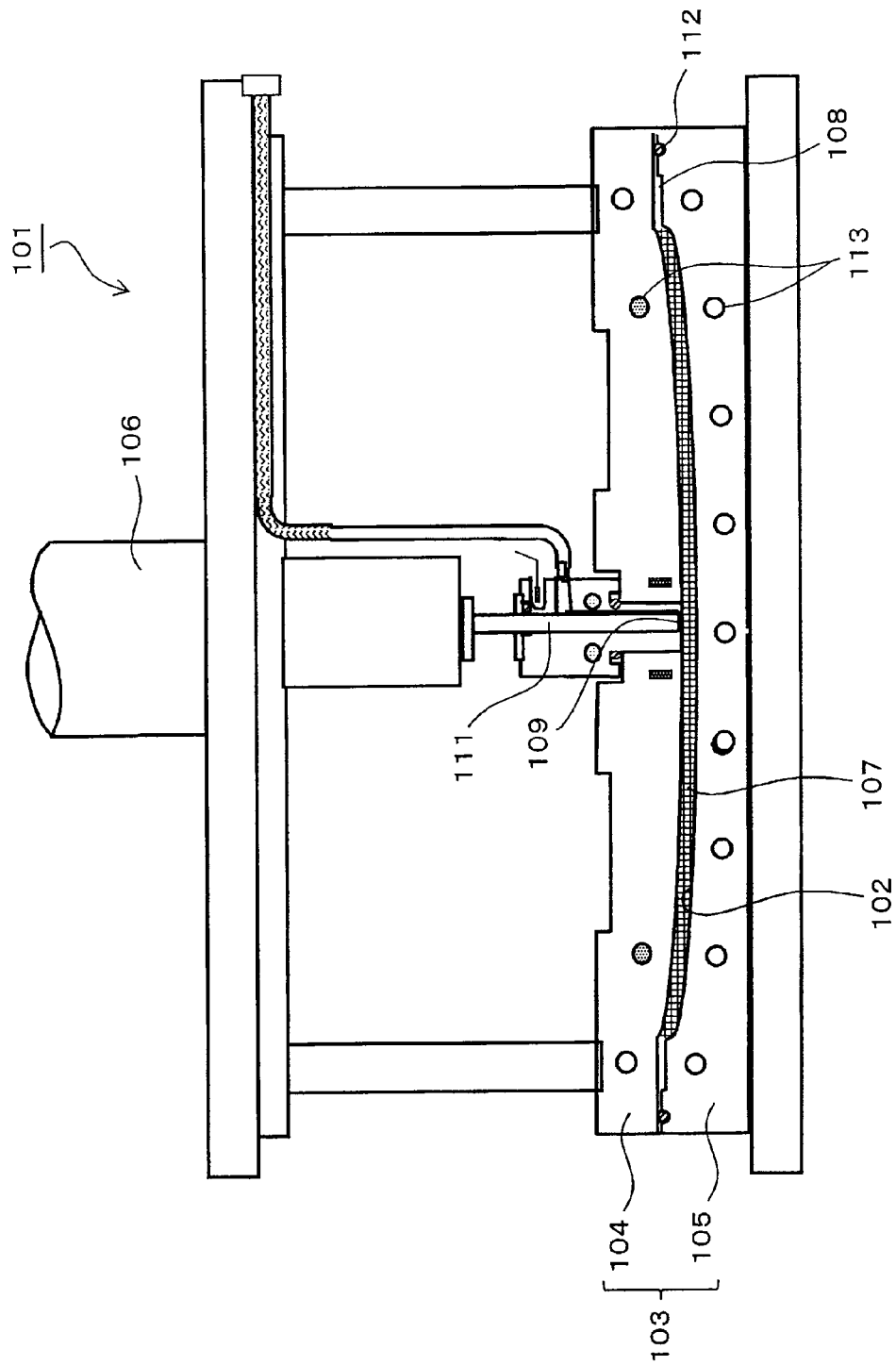
FIG. 6 is a schematic vertical sectional view of an RTM apparatus used for carrying out our method according to a second example, and a sectional view as viewed along B-B line of FIG. 7.

FIG. 6 shows an example of an RTM apparatus used to carry out a method according to a second example. In FIG. 6, RTM apparatus 101 has an upper mold 104 and a lower mold 105 as a mold 103 to form a cavity 102, and the upper mold 104 is closed and opened by a press mechanism 106. In cavity 102, a preform 107, composed of a reinforcing fiber base material, for example, composed of a laminate of reinforcing fiber base materials and, for example, formed in a predetermined shape in advance, is disposed. At a condition where this preform 107 is disposed in cavity 102, upper mold 104 is closed relatively to lower mold 105, a resin to form an FRP is injected from a runner 108 provided around the preform 107 toward the preform 107, a suction port 109 as a suction path is provided relatively to cavity 102, and the injected resin is impregnated through the suction into the reinforcing fiber base material forming the preform 107. Supply of the resin to runner 108 is performed through a resin injection port 110 (shown in FIG. 7) opened at an appropriate position of the runner 108. Suction port 109 is opened/closed by, for example, a pin-like valve body 111 and, relative to cavity 102, the circumference of runner 108 is sealed by a seal material 112. Mold 103 is heated and cooled by, for example, a heat medium circulated in a heat medium circulation path 113, at the time of resin injection, it is heated and a favorable resin impregnation is attempted and, after the resin impregnation, it is cooled (possible by natural heat radiation) and the resin having been injected and impregnated is cured to make a predetermined FRP molded product.

Figure 7:
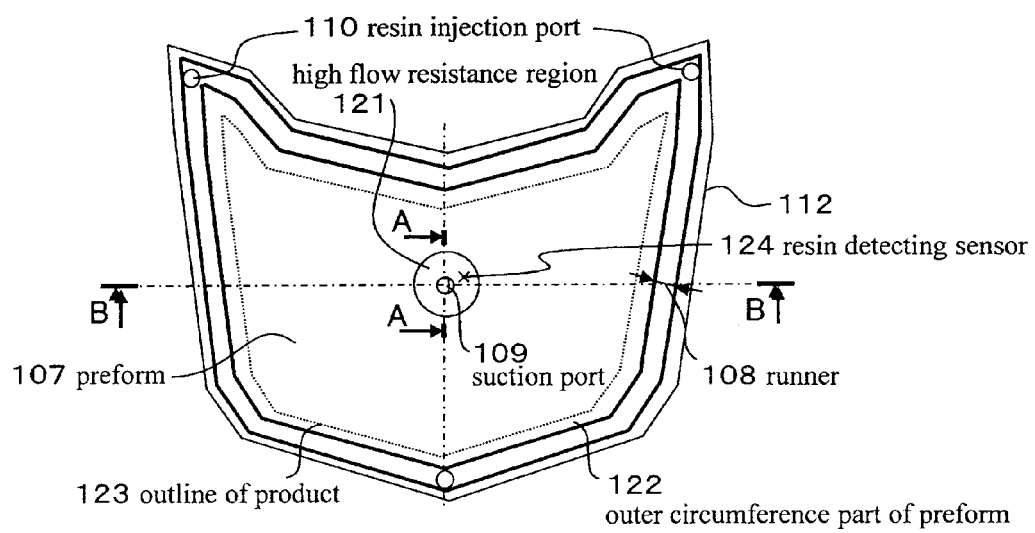
FIG. 7 is a schematic perspective plan view of an interior of a mold of the apparatus depicted in FIG. 6 as viewed from the upper surface side of the mold.
Figure 8:
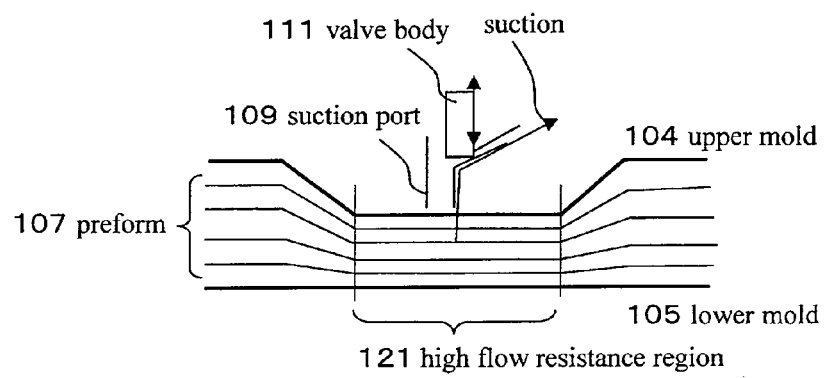
FIG. 8 is an enlarged partial sectional view as viewed along A-A line of FIG. 7.

For example, the planar disposition is shown in FIG. 7, the above-described suction port 109 is disposed at a central part of preform 107 and a part of the preform 107 itself (a corresponding part) corresponding the part around the suction port 109 is formed as a high flow resistance region 121 to partially make the resin flowing from the portion around the corresponding part toward the corresponding part hardly flow at the corresponding part. This high flow resistance region 121 is formed at a position outside the product relatively to the product to be molded or at a position where an appearance design property is not required in the product to be molded and, in this example as shown in FIG. 8, it is formed by partially reducing the thickness of the preform 107 in the region of the product by mold 103 (upper mold 104 and lower mold 105) at the high flow resistance region 121. However, as aforementioned, the high flow resistance region can also be formed by enhancing the density of arrangement of reinforcing fibers in the preform in advance at a position of the high flow resistance region.

In this example, an outline 123 of the product to be molded is set within an outer circumference part of preform 122, and the above-described runner 108 is provided around the preform 107 to extend along the outer circumference part of preform 122 over the entire circumference. To runner 108, as described above, the resin is supplied from resin injection port 110 opened at an appropriate position of the runner 108. Further, at a position near the position provided with suction port 109 in high flow resistance region 121, a resin detecting sensor 124 to detect the resin having flowed into the high flow resistance region 121 is provided.

Figure 9A:
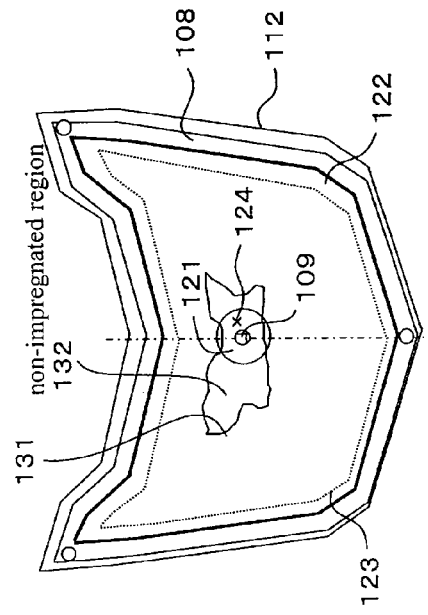
FIGS. 9(A) to 9(D) are schematic plan views showing steps of spreading of an injected resin in the mold depicted in FIG. 7.
Figure 9B:
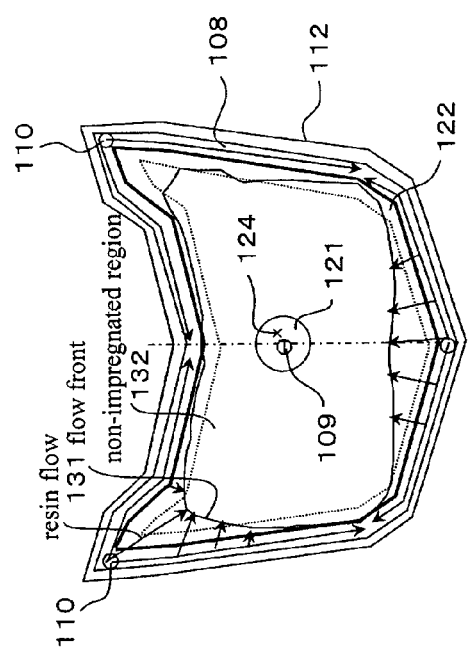
Figure 9C:
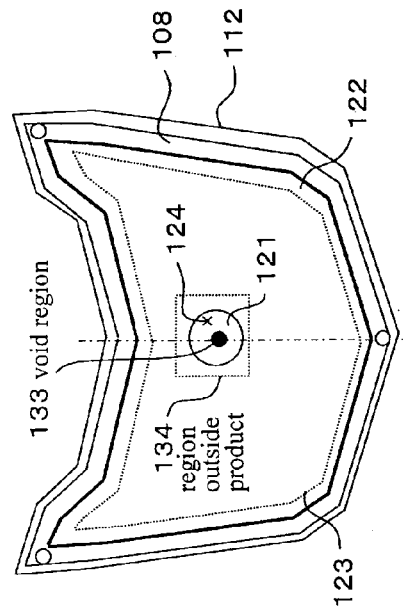
Figure 9D:
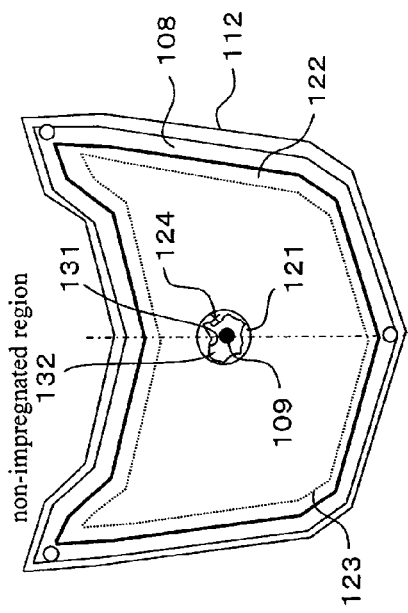

In the method of producing FRP carried out by using thus constructed RTM apparatus 101, the resin supplied from the respective resin injection ports 110 into runner 108 is injected from the runner 108 toward preform 107 from the circumference part of the preform 107, while being flowed in the runner 108. The flow of this injected resin progresses, for example, as shown in FIG. 9(A) to (D). As shown in FIG. 9(A), when the injection from runner 108 toward preform 107 from the circumference part of the preform 107 is started, the shape of flow front 131 indicating the tip portion of the flow of the injected resin spreads from the outer circumference part of preform 122 toward the inside part of the preform 107. The region inside this flow front 131 shows a resin non-impregnated region 132 and, accompanying the progress of the flow front 131 as shown in FIG. 9(B), the non-impregnated region 132 is gradually narrowed in an indefinite shape. Shortly, a part of flow front 131 reaches high flow resistance region 121, at the reached portion the flow resistance of the resin rapidly becomes great, and the spreading of the flow front 131 is suppressed. Parts of flow front 131 which have not yet reached high flow resistance region 121 successively reach the high flow resistance region 121 and, shortly as shown in FIG. 9(C), the entire part of the flow front 131 reaches the high flow resistance region 121, and non-impregnated region 132 is settled within the range of the high flow resistance region 121. Then, when it is detected by resin detecting sensor 124 that the resin has reached a portion near suction port 109, the suction port 109 is closed by the aforementioned valve body 111 and the injection and impregnation of the resin ascribed to the suction is stopped. Even if the suction is stopped, because a negative pressure due to the suction up to that time remains, the flow of the resin toward suction port 109 progresses and, as shown in FIG. 9(D), a void region 133 ascribed to an air trap is reduced substantially down to the range of the suction port 109. Since the region including this void region 133 and the above-described high flow resistance region 121 is set, for example, as a region outside product 134, it may be removed after molding, or in case where it is not a problem in appearance design property, it may be left as it is.

In the above-described steps of the spreading of flow front 131 controlled intentionally with the resin flow, the resin being spread from the outer circumference part of preform 107 toward the inside part of the preform 107 is filled sufficiently well and impregnated into the reinforcing fiber base material of the preform 107 without causing air to be trapped, over the whole of the range of the region of the product to be molded or the region required with a desired surface quality in appearance and, accompanying the resin spreading, air involved in the preform 107, further, even air (bubbles) mixed in the resin, is pushed out successively toward the side of high flow resistance region 121 positioned outside the range of the above-described region, and further, to the position provided with suction port 109. Therefore, the injected resin is impregnated well into the reinforcing fiber base material of the preform without causing air to be involved, selectively over the whole of a target region of the product to be molded, and it becomes possible to achieve a desirable molded state with no air traps.

INDUSTRIAL APPLICATIONS

The method of producing FRP can be applied to any production of FRP using RTM method. and in particular, it is suitable for mass production requiring to produce a molded product excellent in quality at a short period of cycle time.

What is claimed is:

1. A method of producing FRP comprising disposing a preform made of a reinforcing fiber base material in a cavity of a mold, providing a resin injection path and a suction path that sucks at least air to said mold, and causing resin from said resin injection path to flow in a direction toward said suction path in said cavity to be impregnated into said preform, wherein 1) a high flow resistance region for partially making said resin flowing in said preform hardly flow is formed in said preform itself, 2) a flow front of said resin flowing in said direction toward said suction path through said high flow resistance region is controlled to settle within a permitted region that has been predetermined relative to a shape of a product to be molded, 3) said resin injection path is formed from a runner provided around said preform and said suction path is disposed at a central portion of said preform, and said high flow resistance region is formed at a corresponding part corresponding to a part around said suction path as a high flow resistance region to cause said resin flowing in said preform from a part around said corresponding part toward said corresponding part hardly flow at said corresponding part.

2. The method according to claim 1, wherein said high flow resistance region is formed at a position outside a molded product relative to an outline of said product to be molded or at a position where an appearance design property is not required in said product to be molded.

3. The method according to claim 1, wherein resin having flowed into said high flow resistance region is detected at a position near said portion provided with said suction path.

4. The method according to claim 1, wherein said high flow resistance region is formed by reducing a thickness of said preform at said high flow resistance region by said mold.

5. The method according to claim 1, wherein said high flow resistance region is formed by increasing density of an arrangement of reinforcing fibers in said preform at a position of said high flow resistance region in advance.

6. The method according to claim 1, wherein said preform is formed from a laminate of a plurality of reinforcing fiber base materials, and resin flow resistance of a reinforcing fiber base material of an inner layer is lower than that of a reinforcing fiber base material of a surface layer.

7. The method according to claim 1, wherein a thickness of said preform in an area within said product to be molded before being disposed is greater than a height of a corresponding part of said cavity.

8. The method according to claim 2, wherein resin having flowed into said high flow resistance region is detected at a position near said portion provided with said suction path.

* * * * *